United States Patent [19]
Brisard

[11] Patent Number: 4,458,234
[45] Date of Patent: Jul. 3, 1984

[54] ON-BOARD APPARATUS FOR MONITORING THE CONDITION OF SHOCK ABSORBERS

[76] Inventor: Gerard J. Brisard, 52, rue Louis-Auroux, 94120 Fontenay Sous Bois, France

[21] Appl. No.: 339,848

[22] Filed: Jan. 18, 1982

[30] Foreign Application Priority Data

May 14, 1981 [FR] France .................................. 81 09579

[51] Int. Cl.³ .......................................... B60Q 1/00
[52] U.S. Cl. ...................... 340/52 R; 73/570; 73/DIG. 4; 340/665; 340/669; 340/683
[58] Field of Search ............... 340/52 R, 679, 682, 340/683, 685, 666, 665, 669; 73/649, 570, DIG. 4

[56] References Cited

U.S. PATENT DOCUMENTS

| | | | |
|---|---|---|---|
| 2,288,683 | 7/1942 | Clancy | 340/669 X |
| 2,923,147 | 2/1960 | MacMillan | 73/649 X |
| 3,151,258 | 9/1964 | Sonderegger et al. | 73/DIG. 4 |
| 3,646,512 | 2/1972 | Borgstede | 340/52 R |
| 3,713,129 | 1/1973 | Buchholz | 340/685 |
| 3,833,094 | 9/1974 | Grossman | 340/52 R |
| 4,078,224 | 3/1978 | Mize | 340/52 H |
| 4,088,015 | 5/1978 | Wolfer | 73/DIG. 4 |
| 4,317,105 | 2/1982 | Sinha et al. | 340/683 X |

FOREIGN PATENT DOCUMENTS 431283  2/1948  Italy .............................. 340/52 R Primary Examiner—David L. Trafton
Attorney, Agent, or Firm—Learman & McCulloch

[57] ABSTRACT

A vehicle equipped with a spring and shock absorber suspension has a piezoelectric wafer interposed between the spring and a part of the vehicle in such manner as to cause the wafer to be subjected to a compressive or decompressive force in response to relative vertical movement of the vehicle part and the suspension. The application of such force to such wafer results in the generation of an electrical current pulse which is transmitted to an indicator mounted within the vehicle in a position to enable the driver to monitor the condition of the shock absorber.

14 Claims, 3 Drawing Figures

ON-BOARD APPARATUS FOR MONITORING THE CONDITION OF SHOCK ABSORBERS

BACKGROUND OF THE INVENTION

The present invention relates to on-board instruments for monitoring the condition of a vehicle's shock absorbers, thereby increasing the safety of automobile driving. The suspension of a car is generally made from a spring and shock absorber assembly, the arrangement and construction of which are such as to give the best compromise between comfort and safety.

Generally, when a vehicle is new the driving safety, sometimes referred to as roadability, is good, but if trouble with the suspension damping elements occurs (i.e., wear or breakdown) a serious decline in the roadability can result. Very often, however, the average driver is unaware of the decline. Therefore, it is desirable to have a visual, simple and efficient monitoring means such as those available for tire pressure, for example, to monitor constantly the condition of the shock absorbers.

For a long time it has been possible to test shock absorbers with devices installed in garages or lines of general car inspection, but it is rare that the owner of a car has his shock absorbers inspected oftener than yearly, which leaves a long period during which a serious malfunction can occur and involve an accident. Therefore, it is in the driver's best interest to be informed continuously of the condition of the suspension damping system of his vehicle, and that is the purpose of the present invention.

In a typical car suspension, each wheel axle, or half-axle, is connected to the sprung mass (the body) through a spring (metallic or fluid) with which is associated a generally hydraulic shock absorber separate from the spring. The function of the shock absorber is to absorb a portion of the energy transmitted to or by the spring, usually by converting the energy to heat, and thereby the amplitude of relative vertical movements of the wheels and body.

SUMMARY OF THE INVENTION

The present invention recognizes that whenever a vehicle wheel is subjected to a bump or the like which results in relative vertical movement between the wheel and the car body, the magnitude of the force absorbed by the shock absorber is directly related to its effectiveness. By utilizing detector means responsive to the application of vertical forces on the spring both positive and negative, the condition of the shock absorber may be monitored. This result is achieved by mounting one or more detectors capable of generating an electric pulse in positions to be subjected to such forces and by coupling such detectors to indicators mounted inside the car. The pulse generating detectors conveniently may comprise piezoelectric wafers.

DESCRIPTION OF THE DRAWINGS

Other features and advantages of the invention will appear from the following description when it is considered with reference to the accompanying drawings wherein.

THE PREFERRED EMBODIMENTS

Figure 1:
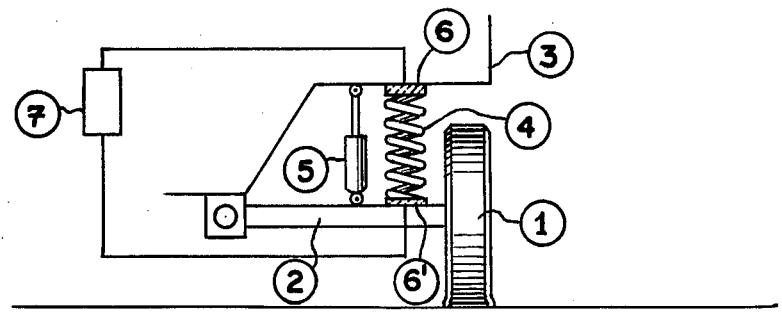
FIG. 1 is a schematic elevational view of a vehicle wheel axle and suspension arm with a typical coil spring and shock absorber.

The apparatus illustrated in FIG. 1 includes a vehicle wheel 1 mounted on an axle carried by a suspension arm 2 connected to the sprung mass or vehicle body 3 by means of a suspension spring 4 and a shock absorber 5 interposed between the arm 2 and the body 3. A compression sensitive pick-up device or detector 6 is installed between the body 3 and the spring 4. If desired, a pick-up device 6' similar to the device 6 may be installed between the spring 4 and the suspension arm 2. The device 6' may be in lieu of or in addition to the pick-up device 6.

The pick-up devices 6 and 6' advantageously may comprise a piezoelectric crystal element of known construction and which is operable to generate an electric voltage when it flexes as a result of compression or decompression, the magnitude of the voltage being proportional to the rate and magnitude of compression and decompression. These elements have several desirable characteristics for this particular application. For example, they are rather cheap, they require no outside electrical supply to function, and they give no current output when the compression/decompression frequency is zero, regardless of the static force applied to them.

The pick-up devices 6 and 6' are connected in known manner by suitable wiring, amplifiers, direction controls, and the like to a suitable current measuring device 7 of known construction which is operable to measure the magnitude of the induced current caused by compression and decompression of the pickup devices and generate a signal if the magnitude reaches a predetermined value. Thus, when the vehicle is stopped, whatever its load may be, no current will be generated by the pick-up devices 6 and 6'. It is only when the pick-up device is compressed or decompressed that current is generated and it is this which it is desired to measure.

Figure 2:
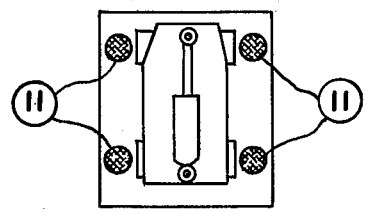
FIG. 2 is an elevational view of the on-board, dashboard-mounted warning device.

The measuring device 7 could be a simple and conventional galvanometer for alternating current if its sensitivity and internal resistance are appropriate, but it is probable that such a means of measurement display would be considered cumbersome, expensive, and difficult to read for the average driver. Therefore, the measurement and display device 7 may comprise an electric current level detector for setting an alarm, for example an LED, as soon as the current generated by the pick-up device reaches or exceeds a preset value. Thus, it is possible to incorporate four LEDs 11 in a display mounted on the vehicle's dashboard and oriented to the vehicle's wheels as illustrated in FIG. 2.

When a force is applied to the suspension arm 2 to move it vertically, the force is transmitted to both the spring and the shock absorber and divided between them proportional to the effectiveness of the shock absorber. If the shock absorber is very stiff, it will yield very little, thereby permitting little movement of the arm 2. Thus, the spring 4 will be subjected to a relatively low proportion of the force, and the force transmitted by the spring to the device 6 and/or 6' will be correspondingly low, thereby enabling the latter to generate a relatively low value electrical pulse. If the shock absorber is worn or malfunctions, it will absorb very little of the force, thereby enabling relatively great movement of the arm 2. The device 6 and/or 6' thus will be subjected to a correspondingly greater force via the spring thereby resulting in the generation of a relatively strong electrical pulse. The measurement of the strength of the pulses, therefore, reflects the effectiveness of the shock absorber. That is, the higher the value of the current pulse, the less effective is the shock absorber, and vice versa.

Figure 3:
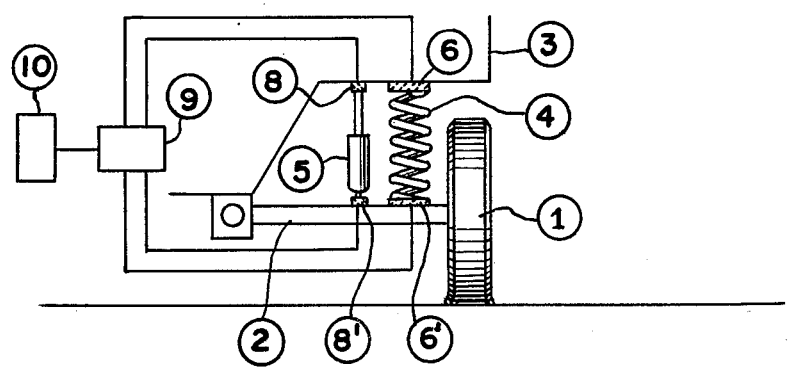
FIG. 3 is a schematic view similar to FIG. 1, but illustrating a modification.

FIG. 3 illustrates an alternative embodiment of the present invention. In this embodiment a pick-up device 8 (like the pick-up device 6) is interposed between the shock absorber 5 and its connection to the sprung mass 3, and/or a similar pick-up device 8' is interposed between the same shock absorber 5 and the suspension arm 2. The pulses generated by the pick-up devices 6 and 8 (and 6' and 8') are transmitted to a known current comparator 9 which is connected to a measurement device 10 like the device 7. The pulses delivered by the pick-up devices 6 and 8 (and 6' and 8') being in phase, their comparison will give with great precision the working condition of the shock absorber. For example, a high pulse generated by the pick-up device 6 compared with no pulse or a weak one generated by a pick-up device 8 will indicate a shock absorber with no damping. Of course, the devices 9 and 10 will have to be adjusted in known manner to give readings and an alarm in accordance with the damping requirements specified by the vehicle manufacturer.

The present invention provides a device enabling an automobile driver to be informed continuously of the working condition of the shock absorbers of his car, and constitutes a significant stride forward in the dynamic safety of automobile vehicles.

I claim:

1. Apparatus for monitoring the working condition of a vehicle's suspension having a spring and a shock absorber interposed between a sprung mass and a wheel support, said apparatus comprising first detector means interposed between said mass and said spring in a position to be subjected to a force in response to relative vertical movement between said mass and said wheel support; second detector means interposed between said mass and said shock absorber in a position to be subjected to a force in response to said relative vertical movement, each of said detector means corresponding to the other and being responsive to the application of such force to generate an electrical pulse; measurement means coupled to each of said detector means for receiving and measuring the magnitude of said pulse; and indicating means coupled to said measurement means for indicating the magnitude of said pulse.

2. Apparatus according to claim 1 wherein said first and second means are coupled to a comparator, said comparator being connected to said indicating means.

3. Apparatus according to claim 1 including third detector means interposed between said spring and said wheel support, and fourth detector means interposed between shock absorber and wheel support, all of said detector means corresponding to one another.

4. Apparatus for monitoring the working condition of a vehicle's suspension having a spring and a shock absorber interposed between a sprung mass and a wheel support, said apparatus comprising first detector means interposed between said spring and said wheel support in a position to be subjected to a force in response to relative vertical movement between said mass and said wheel support; second detector means interposed between said shock absorber and said wheel support in position to be subjected to a force in response to said relative movement, each of said detector means corresponding to the other and being responsive to the application of such force to generate an electrical pulse; measurement means coupled to said detector means for receiving and measuring the magnitude of said pulse; and indicating means coupled to said measurement means for indicating the magnitude of said pulse.

5. Apparatus according to claim 4 wherein said first and second means are coupled to a comparator, said comparator being connected to said indicating means.

6. Apparatus for monitoring the working condition of a vehicle's suspension having a spring member and a shock absorber member interposed between and interconnecting a sprung mass and a wheel support, said apparatus comprising dynamic force detector means interposed between one of said members and a selected one of said mass and said wheel support so as to be subjected to a momentary dynamic force by said one of said members in response to relative vertical movement between said mass and said wheel support, said detector means being responsive solely to the momentary application thereon of such dynamic force to generate an electrical pulse having a magnitude proportional to that of said force; measurement means coupled to said detector means for receiving and measuring the magnitude of the pulse generated thereby; and indicating means coupled to said measurement means for indicating the magnitude of said pulse.

7. Apparatus according to claim 6 wherein said indicating means is mounted within the vehicle and within the view of its driver.

8. Apparatus according to claim 6 wherein said detector means is interposed between said mass and said spring member.

9. Apparatus according to claim 6 wherein said detector means is interposed between said mass and said shock absorber member.

10. Apparatus according to claim 6 wherein the detector means is interposed between said wheel support and said spring member.

11. Apparatus according to claim 6 wherein said detector means is interposed between said wheel support and said shock absorber member.

12. Apparatus according to claim 6 wherein said detector means comprises a piezoelectric member.

13. Apparatus according to claim 12 wherein said piezoelectric member is coupled electrically to an electric current measuring device.

14. Apparatus according to claim 13 wherein said measuring device is connected to an electric current indicator.

* * * * *